(12) United States Patent  
Ozaki

(10) Patent No.: US 7,773,132 B2
(45) Date of Patent: Aug. 10, 2010

(54) IMAGE PROCESSING DEVICE AND METHOD, AND VIDEO CAMERA WITH ZEBRA PATTERN FEATURES

(75) Inventor: Nozomu Ozaki, Kanagawa (JP)

(73) Assignee: Sony Taiwan Limited, Taipei (TW)

( * ) Notice: Subject to any disclaimer, the term of this patent is extended or adjusted under 35 U.S.C. 154(b) by 1002 days.

(21) Appl. No.: 11/452,941

(22) Filed: Jun. 15, 2006

(65) Prior Publication Data

US 2007/0002151 A1 Jan. 4, 2007

(30) Foreign Application Priority Data

Jun. 30, 2005 (TW) .............................. 94122488 A

(51) Int. Cl.
*H04N 5/217* (2006.01)
(52) U.S. Cl. ................ 348/241; 348/222.1; 348/333.02
(58) Field of Classification Search .............. 348/222.1, 348/234, 236–238, 246–248, 333.1, 333.02
See application file for complete search history.

(56) References Cited

U.S. PATENT DOCUMENTS

| 5,025,308 | A  | * | 6/1991  | Lee ............................. 348/181 |
| 6,396,508 | B1 | * | 5/2002  | Noecker ...................... 345/693 |
| 6,785,329 | B1 | * | 8/2004  | Pan et al. ............... 375/240.08 |
| 6,812,969 | B2 | * | 11/2004 | Ide et al. ..................... 348/346 |
| 2007/0237415 | A1 | * | 10/2007 | Cao et al. ................... 382/254 |

* cited by examiner

*Primary Examiner*—Gevell Selby
(74) *Attorney, Agent, or Firm*—Oblon, Spivak, McClelland, Maier & Neustadt, L.L.P.

(57) ABSTRACT

An image processing device utilizes a morphological filter such as an opening type morphological filter and a closing type morphological filter to remove a hole or a chunk in an over-luminance area of an image, thereby to display a zebra pattern masked on the over-luminance area more clearly, and accordingly a user can achieve a high quality image.

17 Claims, 6 Drawing Sheets

IMAGE PROCESSING DEVICE AND METHOD, AND VIDEO CAMERA WITH ZEBRA PATTERN FEATURES

FIELD OF THE INVENTION

The present invention relates to an image processing apparatus and method capable of indicating an over-illuminated area, and a video camera using the apparatus. In particular, this invention relates to an image processing device and method, which can mask an over-luminance area with a zebra pattern, and a video camera using the device.

This invention also provides an area detection function for generating and displaying a zebra pattern in an image. This invention can improve the shape of a detected area in an image and make the area cleaner by removing noises such as holes or chunks from the detected area. For this purpose, a morphological filter will be applied to the detected area in the image.

BACKGROUND OF THE INVENTION

In an image apparatus such as a video camera, a zebra pattern may be generated for indicating an over-luminance area of a picked up image in order to suggest a user to use a neutral density (ND) filter for reducing the intensity of light entering into an image sensor, thereby to achieve a high quality image. The over-luminance area is an area that has a luminance level exceeding a predetermined threshold level.

In general, the image apparatus can detect and select the over-luminance area based on a luminance detection, which may be implemented by hardware, software, or firmware. After that, a zebra pattern generator generates a zebra pattern to mask the over-illuminated area, based on information related to the selected over-luminance area. The operation and arrangement of the prior art technologies are further explained by a given example below.

In the conventional image apparatus, since the zebra pattern generator generates the zebra pattern and simply masks the over-illuminated area with this zebra pattern, the zebra pattern area displayed by such simple operations becomes discontinuous in a noisy environment or in a situation of a broader over-luminance threshold window, and thus has holes and noise patterns therein. In such case, the zebra pattern becomes unclear. To avoid such problem, some processes are required before generating the zebra pattern so as to generate a clearer area.

FIG. 1a to 1d are views explaining the operation for detection of an over-luminance area and for generation and display of a zebra pattern according to one example of a prior art video camera. As shown in FIG. 1a, an image frame 1 is the area picked up by the camera. In the frame 1, a mountain 2 is at the lower part of the captured area and has a low luminance level, the sky 3 has a luminance level relatively high but not higher than a threshold level, and a cloud 4 is an over-luminance area. In such case, an over-luminance detector finds that the cloud area 5 shown in FIG. 1b is over-illuminated. According to the information related to the cloud area 5, a zebra pattern generator generates a zebra pattern 6 as shown in FIG. 1c and overlays the cloud area 5 with the pattern 6 so as to generate a zebra pattern cloud area 7 as shown in FIG. 1d. White lines and black lines in the zebra pattern cloud area 7 may horizontally and vertically move for indicating the zebra pattern.

FIG. 5 shows one example of the arrangement of a prior art system for detecting luminance level and for generating and displaying a zebra pattern. As shown in FIG. 5, an input video signal 20 is input to the luminance detector 22. If the detector 22 detects an area having luminance level higher than the threshold, the information related to the detected area will be sent to a zebra generator 24 from the detector 22. The zebra generator 24 generates the zebra pattern and outputs it to a mixer 26. In the mixer 26, the video signal representing the pattern is overlapped with the input video signal 20 for generating a zebra pattern overlapping area to indicate the over-luminance area.

According to the prior art technologies, as shown in FIG. 2, the detected over-illuminated area becomes unclear as the noise level or the luminance level of the image becomes closer to the threshold. Therefore, holes or chunks may be generated in the detected over-illuminated area 8. One of the reasons causing such phenomenon may be due to the noise. Another reason is that the threshold used for the luminance detection is very closer to the luminance of some areas. The detected luminance level may randomly become higher or lower than the threshold because of little noises. This will generates holes or chunks in the detected over-luminance area. If such over-luminance information is used, holes or chunks will be generated in the zebra pattern 9, as shown in FIG. 2b, and the displayed zebra pattern will become unclear. In such situation, it becomes difficult for the user to understand or identify the zebra pattern, and the displayed zebra pattern is also unclear. In case of noises, the zebra pattern temporarily varies with noises in the original image.

SUMMARY OF THE INVENTION

In view of the above, this invention utilizes a morphological filter to allow a zebra pattern overlapped on a detected over-luminance area to be displayed more clearly.

According to one aspect of this invention, an image processing device is provided, the device comprising: detecting means for detecting a luminance of an input video signal, and comparing the detected luminance with a predetermined threshold so as to detect an over-luminance area; morphological filtering means for applying an opening operation and a closing operation to the detected over-luminance area so as to remove a hole or a chunk existing in the detected area, the opening operation being defined as: $X_B=(X \ominus B_s) \oplus B$, and the closing operation being defined as: $X_B=(X \oplus B_s) \ominus B$, where X is the video signal, B is a set of structuring element, $B_s$ is a set symmetrical to B, $\oplus$ is Minkowski addition, $\ominus$ is Minkowski subtraction, $X_B$ is the result of operation; zebra pattern generating means for generating a zebra pattern video signal; signal mixing means for overlapping the zebra pattern video signal with the processed video signal to form a mixing signal for output; and a display for displaying the image represented by the video signal and the zebra pattern overlapped on the detected over-luminance area in the image, based on the mixing signal.

According to another aspect of this invention, an image processing device is provided, the device comprising: detecting means for detecting a luminance of an input video signal representing a target image, and comparing the detected luminance with a first predetermined threshold so as to extract a first over-luminance video signal representing an over-luminance area; morphological filtering means for applying a morphological filtering process to the first over-luminance video signal so as to generate a second video signal; second detecting means for detecting a second over-luminance video signal higher than the adaptive threshold in the second video signal by using an adaptive threshold; over-luminance signal mixing means for adding the first over-luminance video signal and the second over-luminance video signal to form a third over-luminance video signal; zebra pattern generating means for generating a zebra video signal and overlapping the zebra video signal with the third over-luminance video signal to generate and output a first mixing signal formed by the zebra pattern video signal and the third over-luminance video signal; video signal mixing means for mixing the first mixing signal and the video signal representing the target image to generate and output a second mixing signal; and display means for displaying the target image, in which the over-luminance area is masked by the zebra pattern, based on the second mixing signal.

According to still another aspect of this invention, a video camera comprising an image processing device of this invention.

According to still another aspect of this invention, an image processing method for indicating an over-luminance area in a target image displayed on a display is provided, the method comprising steps of: receiving a video signal representing the target image; detecting a luminance of the input video signal, and comparing the detected luminance with a predetermined threshold so as to detect an over-luminance area; applying an opening operation and a closing operation to the detected over-luminance area so as to remove a hole or a chunk existing in the detected area, the opening operation being defined as: $X_B = (X \ominus B_s) \oplus B$, and the closing operation being defined as: $X_B = (X \oplus B_s) \ominus B$, where X is the video signal, B is a set of structuring element, $B_s$ is a set symmetrical to B, $\oplus$ is Minkowski addition, $\ominus$ is Minkowski subtraction, $X_B$ is the result of operation; generating a zebra pattern video signal; overlapping the zebra pattern video signal with the processed video signal to form a mixing signal for output; and displaying the image represented by the video signal and the zebra pattern overlapped on the detected over-luminance area in the image, based on the mixing signal.

According to still another aspect of this invention, an image processing method for indicating an over-luminance area in a target image displayed on a display is provided, the method comprising steps of: receiving a video signal representing the target image; detecting. a luminance of the input video signal, and comparing the detected luminance with a first predetermined threshold so as to extract a first over-luminance video signal representing an over-luminance area; applying a morphological filtering process to the first over-luminance video signal so as to generate a second video signal; detecting a second over-luminance video signal higher than the adaptive threshold in the second video signal by using an adaptive threshold; adding the first over-luminance video signal and the second over-luminance video signal to form a third over-luminance video signal; generating a zebra video signal and overlapping the zebra video signal with the third over-luminance video signal to generate and output a first mixing signal formed by mixing the zebra pattern video signal and the third over-luminance video signal; mixing the first mixing signal and the video signal representing the target image to generate and output a second mixing signal; and displaying the target image, in which the over-luminance area is masked by the zebra pattern, based on the second mixing signal.

According to this invention, the holes and the chunks appearing in the over-luminance area, which are formed by noise and a not well defined threshold, can be removed, and thus the zebra pattern overlying on the over-luminance area can be clearly displayed to allow a user know the over-luminance area and improve the quality of the image.

DETAILED DESCRIPTION OF THE PREFERRED EMBODIMENTS

The embodiments according to this invention will be explained, with reference to accompanying drawings.

According to one embodiment of this invention, a special morphological filter is used to improve the 1 quality of a detected over-luminance area. The morphological filter first removes small noise spots and small chunks, and then removes small holes in the detected area. The same effects can be achieved if these processing procedures are conducted in a reverse order.

According to another embodiment of this invention, a combination of the morphological filter and an adaptive threshold is implemented.

First, the morphological filter will be explained below.

[Morphological Filter]

Basically, two kinds of morphological filters are used in this invention. The morphological filter is to process the topological or geometrical information of an image. The morphological filter is based on a mathematical theory of set, and functions to process an image in two-dimension space, or in any space of selected dimensions. Although the morphological filter is applied to a black and white image for explaining the embodiments, it is appreciated that this invention is not limited to this and is applicable to a gray scale image.

Figure 8:
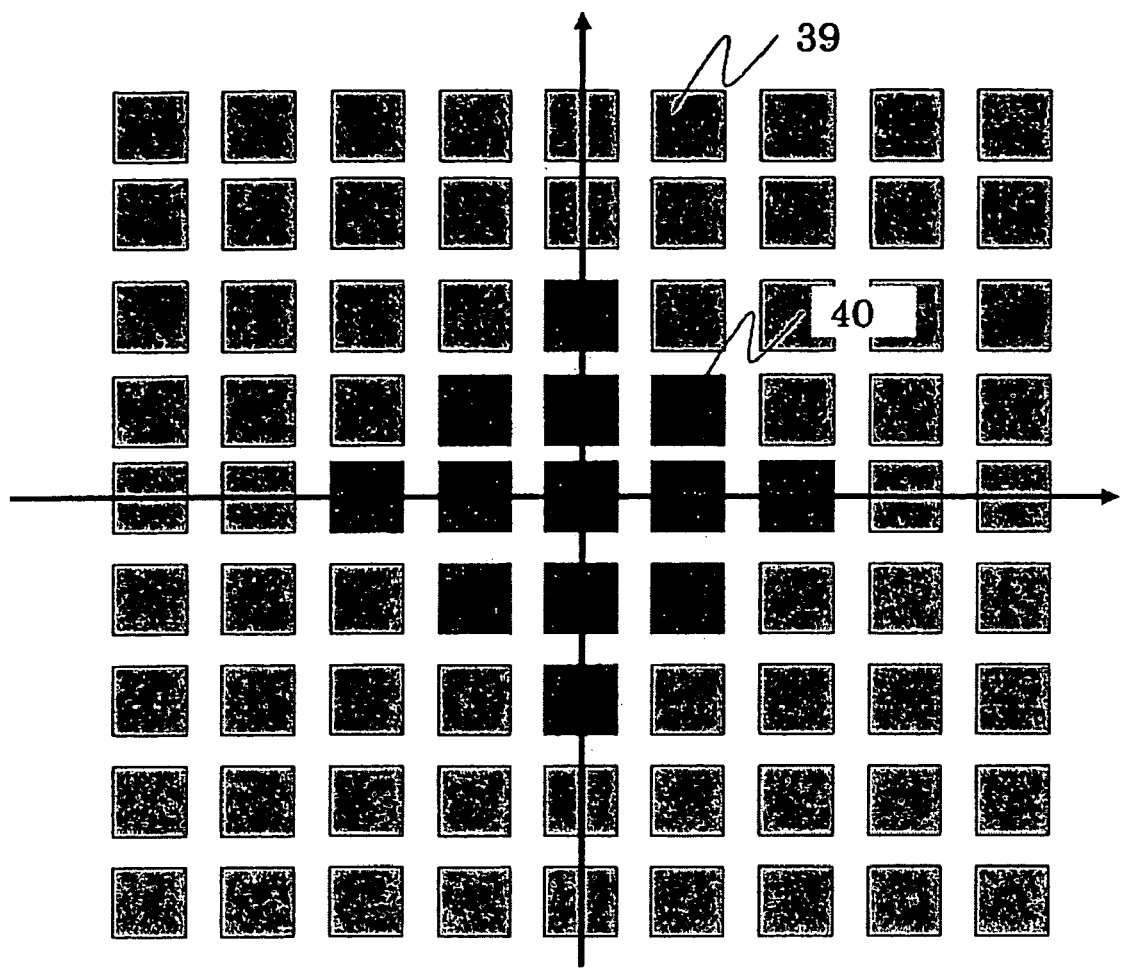
FIG. 8 is a view for explaining an operation of a morphological filter.

First, two operations on the set, Minkowski Addition and Minkowski Subtraction, are defined. Symbol A denotes a target set, namely a target image, and B denotes a structuring element, which is used as an operation on for the target image. A and B can represent sets of two-dimension, binary, discrete elements of pixels in an image space. In general, the structuring elements for this kind of purpose are symmetrical about the origin. For example, as shown in FIG. 8, a two-dimension array of pixels 39 are the pixels to be processed, and the dark colored pixels 40 are elements of B.

The Minkowski Addition $\oplus$ is defined as follows:

$$A \oplus B = \bigcup_{b \in B} (A)_b$$

where $(A)_b$ represents the set in which an original image A is shifted or translated over the b which operates as a vector, and b is the element of B. Minkowski Addition is the addition (set union) for every elements of B.

The Minkowski Subtraction $\ominus$ is defined as follows:

$$A \ominus B = \underset{b \in B}{I}(A)_b$$

Minkowski Subtraction is the product (set intersection) of every elements of B.

The Dilation of A with B is defined as follows:

$$A \oplus B_s = \underset{b \in B}{Y}(A)_{-b}$$

The formula of Dilation is the same as Minkowski Addition, except the structuring elements used here is the set $B_s$, symmetric to B. The symmetric set $B_s$ consists of $-b$, which is symmetrical to element b of B.

The Erosion of A with B is defined as follows:

$$A \ominus B_s = \underset{b \in B}{I}(A)_{-b}$$

The formula of Dilation is the same as Minkowski Subtraction, except the structuring elements used here is the set $B_s$, symmetric to B.

Two kinds of operations, Opening and Closing operations, will be defined by Dilation and Erosion morphological operations. These two operations will be used as morphological filters for the target image X having structuring element B. As illustrated in FIG. 8, the structuring elements are always chosen as small circles around the origin so as to remove noises such as holes and chunks/islands in the image during the image processing. It is noted that the structure elements may be chosen as other circle having a different size, or any other shape. For example, it is possible to use an ellipse shape, which has different sizes in the horizontal and vertical directions, respectively.

The Opening operation of X and B is defined as follows:

$$X_B = (X \ominus B_s) \oplus B$$

The opening operation is a combination of Minkowski subtraction and Minkowski addition. According to the opening operation, the Dilation operation is conducted immediately after the Erosion operation is conducted. The Opening operation on the target image X results in removal of islands or chunks from the image X, depending on the structuring element B. The sizes of the islands/chunks to be removed are usually determined based on the circle size of the structuring element. In general, B is chosen as a symmetric set such as a circle, and accordingly $B_s = B$.

The Closing operation of X and B is defined as follows:

$$X_B = (X \oplus B_s) \ominus B$$

The closing operation is a combination of Minkowski addition and Minkowski subtraction. According to the closing operation, the Erosion operation is conducted immediately after the Dilation operation is conducted. The closing operation on the target image X results in removal of holes from the target image. In general, B is chosen as a symmetric set such as circle, and in this case, $B_s$ is equal to B ($B_s = B$), and the sizes of the holes to be removed is determined based on the size of the circle.

The First Embodiment

Figure 1:
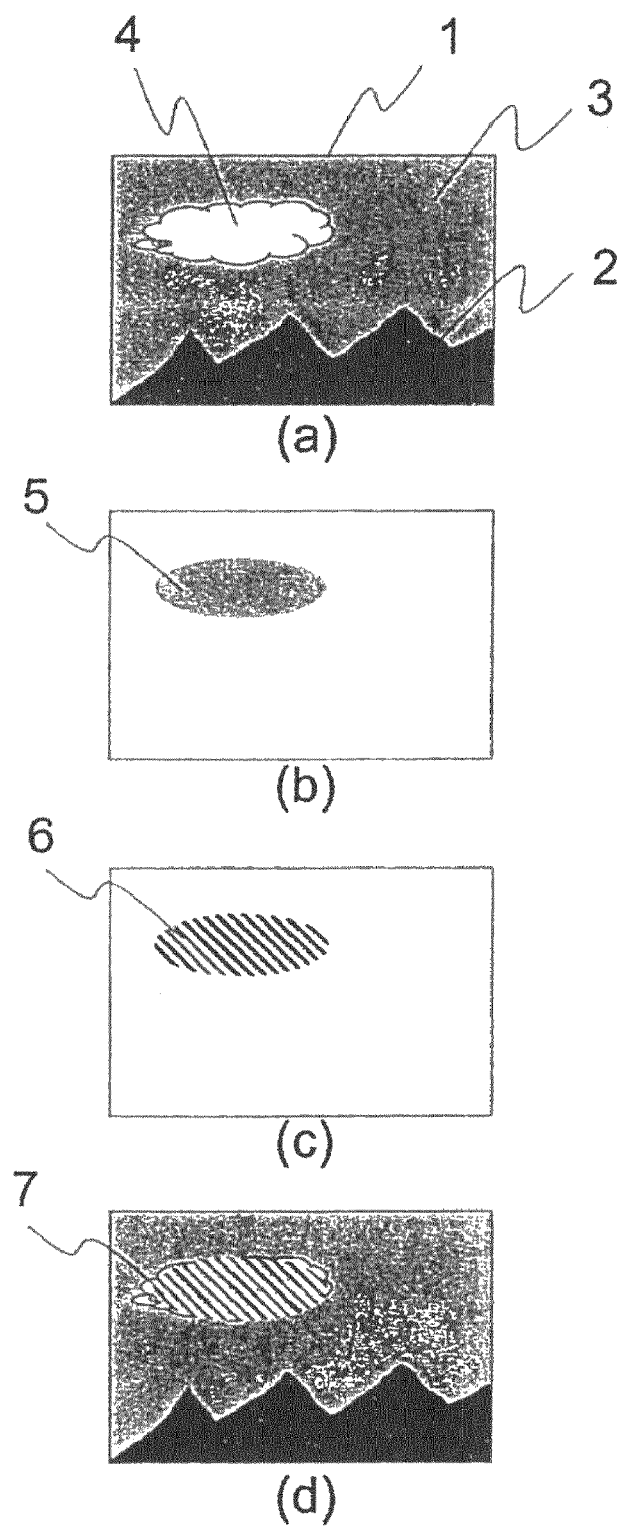
FIG. 1 is a view illustrating an operation for generating and displaying a zebra pattern.
Figure 2:
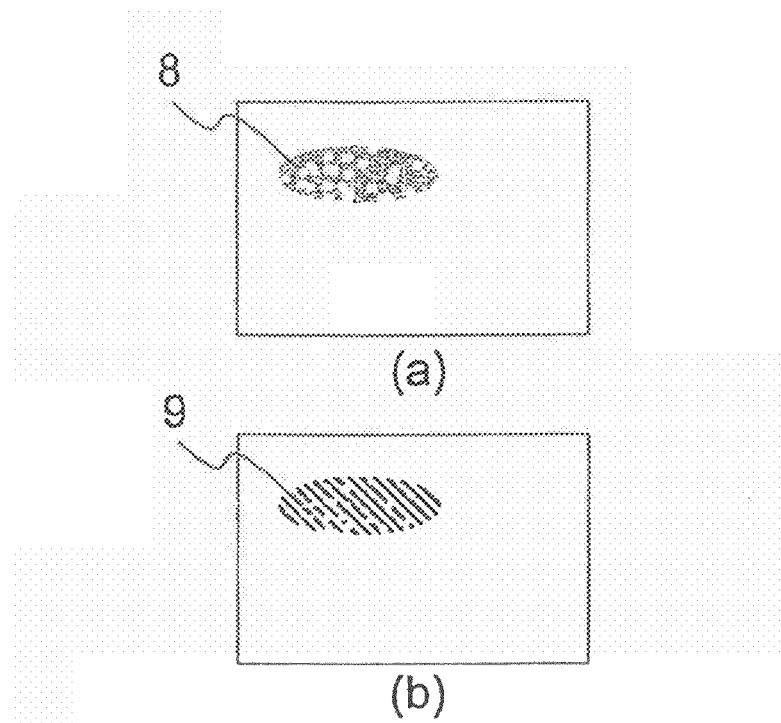
FIG. 2 is a view for explaining the drawbacks of the zebra pattern generated according to the prior art technologies.
Figure 3:
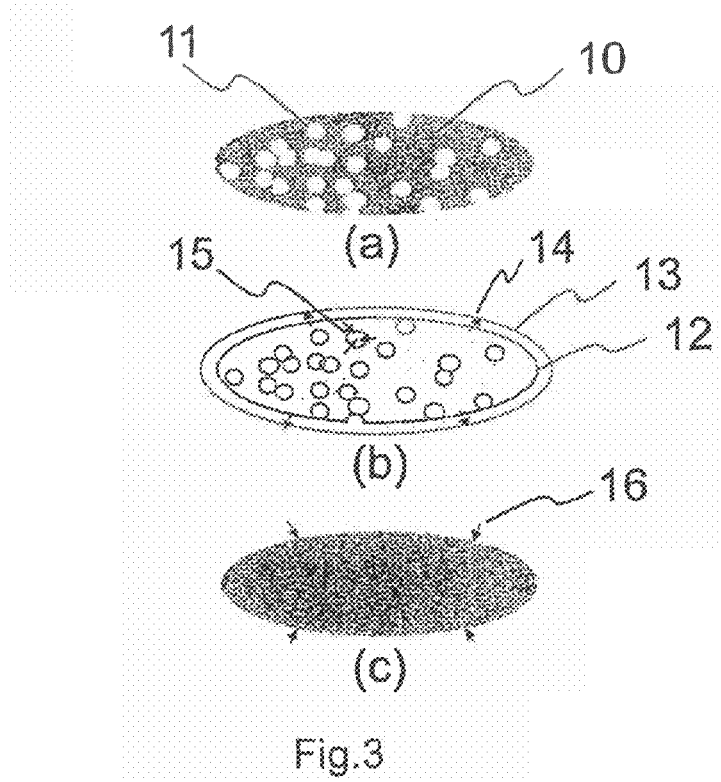
FIG. 3 is a view illustrating a zebra pattern image processing according to one embodiment of this invention.
Figure 4:
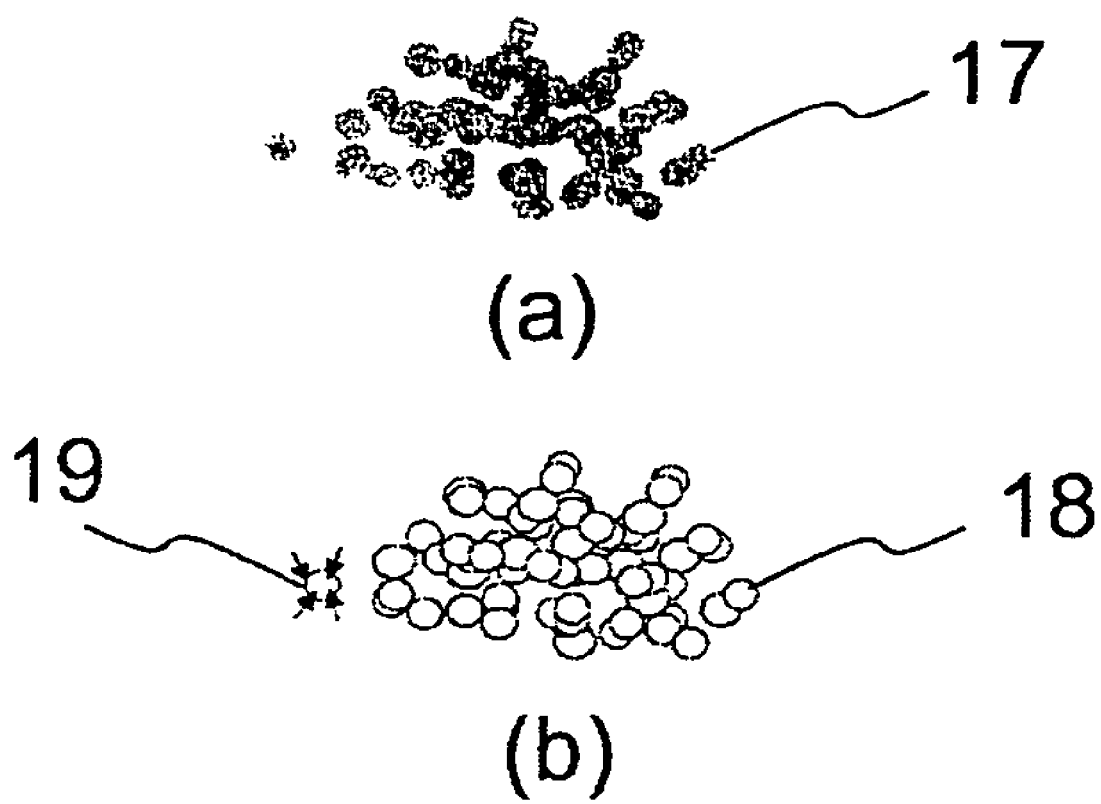
FIG. 4 is a view illustrating a zebra pattern image processing according to one embodiment of this invention.
Figure 5:
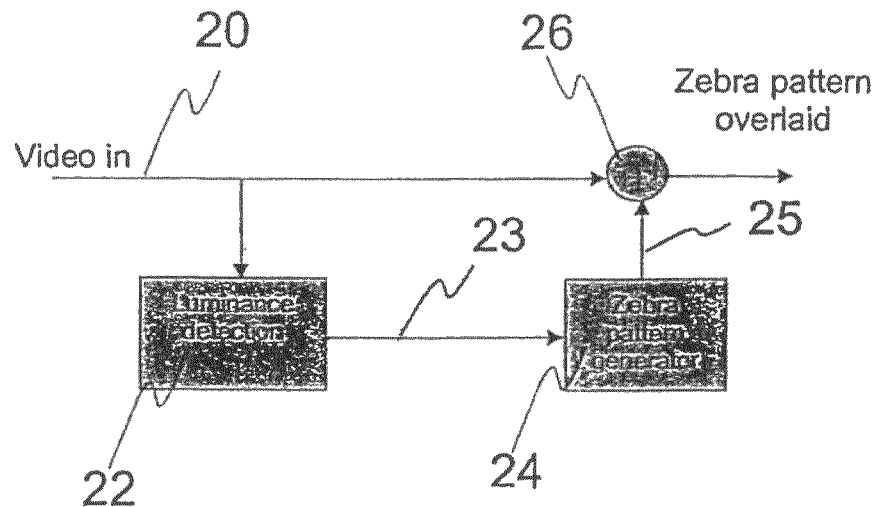
FIG. 5 is a block diagram showing an arrangement of a prior art zebra pattern generation system.

This embodiment utilizes a combination of morphological filters to remove noisy holes and chunks in the area. FIG. 3a shows an area 10, which has a high luminance level and is detected in a noisy situation. As shown in FIG. 3a, the detected area 10 has many holes, which have luminance level lower than a threshold and are surrounded by zones having higher luminance levels. FIG. 4a shows another detected area. As shown in FIG. 4a, a small chunk 17 has a luminance level higher than the threshold and is surrounded by zones having lower luminance levels.

Then, theses areas are processed by two kinds of filters sequentially to remove holes and the small chunk in the detected areas.

For example, the opening operation and closing operation described above is applied successively to these areas. In terms of the final result of processing, the order for applying these operations will not cause any problems. For example, the closing operation can be conducted first to remove the small chunk, and then the opening operation can be conducted to remove holes in the area. Alternatively, the opening operation can be conducted first to remove holes and the closing operation can be conducted subsequently to remove the small chunk.

For example, as shown in FIG. 3b, the closing operation is applied to the detected over-luminance area in which the holes exist. In this case, the detected area is filtered by the Dilation filter (operation) at first. After being filtered, the original area 12 is expanded to a dilation area 13, as indicated by the arrow 14 in FIG. 3b. As denoted by the reference numeral 15 in the FIG. 3b, hole in the area 12 is closed or filled. According to this operation, the holes in the area 12 are closed or filled. Subsequently, the Erosion operation is applied to achieve a clear area without holes, as indicated by the reference numeral 16 shown in FIG. 3c. In this case, the sizes of the removed holes depend on the size of the structuring element.

The opening operation can be applied to remove the noise or small chunk. FIG. 4a shows the small chunks or noise zones in the detected over-luminance area. The reference numeral 17 denotes the detected small chunk. After the opening operation, the erosion and dilation operations are applied sequentially to this zone and the chunk 18 is erased as indicated by reference numeral 19 shown in FIG. 4b.

In general, holes or chunks appearing in the detected area are mainly caused by noise. Because the noise is random, the size of a hole and island in the detected area is just one pixel of the image in this case. Therefore, the size of the structuring element can be smaller in this case.

According to this embodiment, after the opening and the closing operations are applied to the detected area, the chunk/noise in the detected area can be removed so as to make the area clearer. Then, a zebra pattern clearer than the original pattern can be generated based on the information of the detected area obtained by such filtering operations. Thus, the image can be displayed to the user clearly for further processing or for picking up image, etc.

Figure 6:
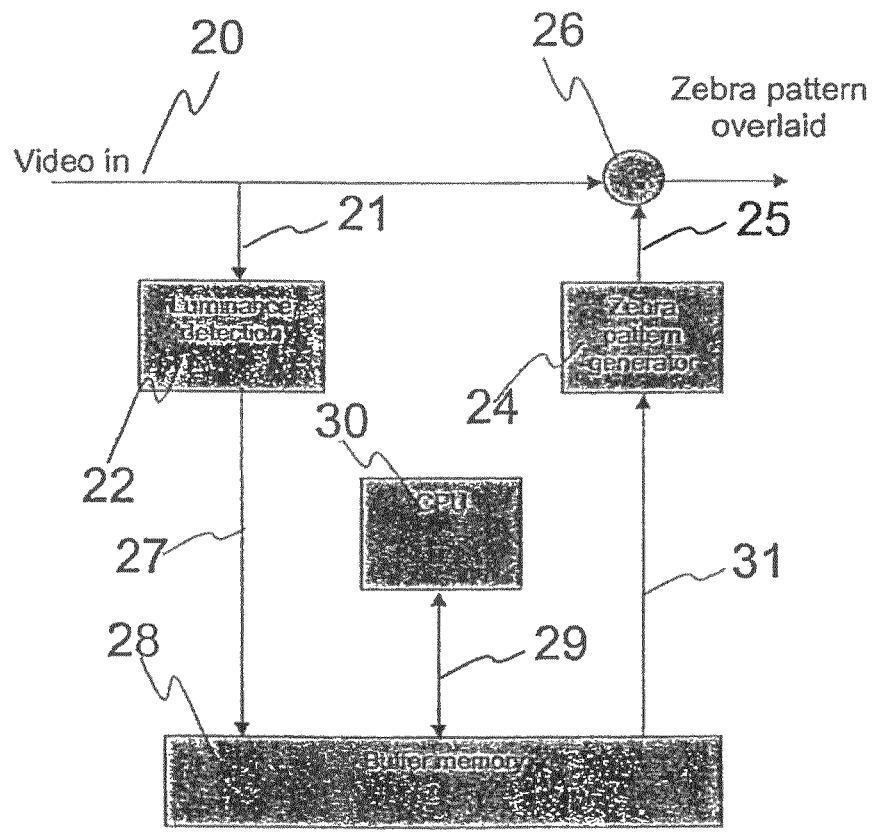
FIG. 6 is a block diagram showing an arrangement of a zebra pattern generation system according to one embodiment of this invention.

FIG. 6 illustrates the block diagram of an image processing device according to one embodiment of this invention. As shown in FIG. 6, a video signal representing an over-luminance area detected by a luminance detector 22 will be sent to a morphological filter. The morphological filter includes a buffer memory 28 and a central processing unit (CPU) 30. After being filtered in the filter, the video signal representing the processed over-luminance area without chunk or hole is sent to a zebra pattern generator 24. Accordingly, the zebra generator 24 generates a zebra pattern video signal to overlap the video signal of the processed over-luminance area and outputs the overlapping video signal to a mixer 26 to be mixed with the video signal 20. The mixed video signal is then output to a device such as a display device so as to display an over-luminance area of the original image, which is masked by the zebra pattern, and the other areas of the original image.

The Second Embodiment

Figure 7:
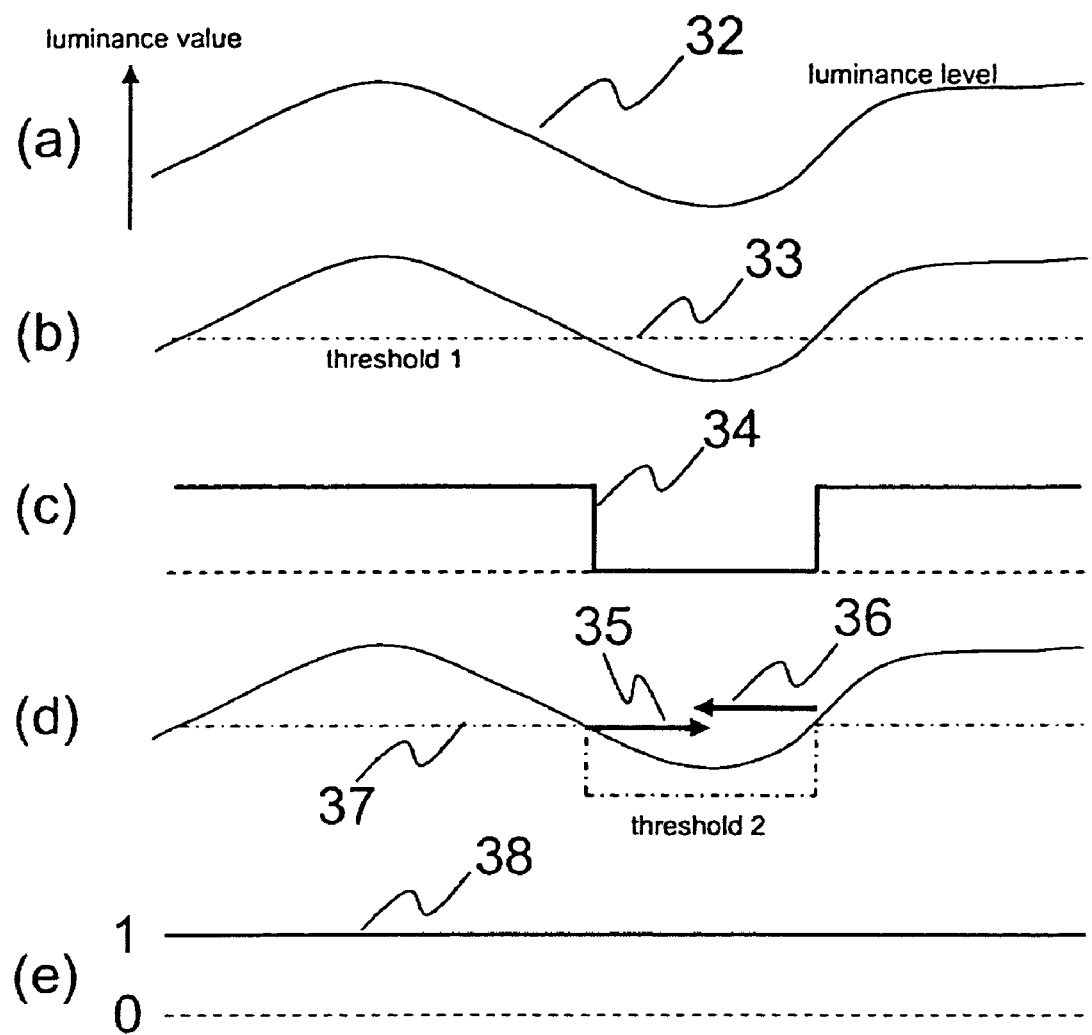
FIG. 7 is a view for explaining an operation for generating a zebra pattern according to another embodiment of this invention.

According to the second embodiment, a combination of a morphological filter and an adaptive threshold is utilized to improve the quality of a detected area. According to this embodiment, more hardware is required for buffering video signals and for adaptive area detection. Now, this invention is explained by a given example of one dimension signal, with reference to FIG. 7. FIG. 7a shows the original luminance of an input video signal 32. As shown in FIG. 7b, this video signal 32 is compared with a threshold 1A denoted by reference numeral 33 so as to obtain a first over-luminance area. FIG. 7c shows the resultant first over-luminance area signal 34. In FIG. 7d, the dilation operation is applied to expand the area as indicated by reference numerals 35 and 36, as described in the first embodiment. A threshold 2A denoted by reference numeral 37 is generated by this dilation operation. This threshold 2A is lower than the original threshold. In this expanded area, this generated threshold 37 is used to detect the expanded over-luminance area again. When a second over-luminance area is found by this detection, it will be added to the first over-luminance area, and then the holes are removed to achieved a resultant area denoted by 38 as shown in FIG. 7e. The resultant area 38 is clear.

The threshold can be adaptable to the varying conditions of the detected area such as the sizes of hole and the chunk. Alternatively, based on multiple thresholds to be used, the threshold can vary with the size of the structuring element.

Although one-dimension signal is given as one example for purpose of explanation in the above, this invention is not limited to one-dimension signal and can be applied to two-dimension or three-dimension signals.

According to this invention, a zebra pattern can be clearly displayed and the over-luminance area can be indicated clearly.

According to this invention, the structuring element can be chosen depending on the video signal and situations. In general, the symmetric element is chosen but this invention is not limited to the symmetric element. The structuring element can be adaptive, and vary with the video signal or the features of the detected area. The structure elements used in the dilation and the erosion operations can be different.

The adaptive threshold in the second embodiment can be adaptable to the video signal and the features of the detected area. The combination of the erosion operation and the adaptive threshold can also be used to remove the small chunk having small area and noises.

While the present invention has been described with respect to embodiments, those skilled in the art will appreciate numerous modifications and variations therefrom. It is intended that the appended claims cover all such modifications and variations as fall within the true spirit and scope of this present invention.

What I claim is:

1. An image processing device comprising:
    detecting means for detecting a luminance of an input video signal representing a target image, and comparing the detected luminance with a predetermined threshold so as to extract an over-luminance video signal representing an over-luminance area;
    filtering means for applying an operation to the over-luminance video signal so as to remove a hole or a chunk existing in a detected area;
    zebra pattern generating means for generating a zebra pattern video signal and overlapping the zebra pattern video signal with the processed over-luminance video signal so as to generate and output a first mixing signal formed by mixing the zebra pattern video signal and the over-luminance video signal;
    signal mixing means for mixing the first mixing signal and the video signal representing the target image to generate and output a second mixing signal; and
    a display for displaying the image having the zebra pattern overlapped on the detected over-luminance area, based on the second mixing signal, wherein said filtering means applies an opening operation and a closing operation to the over-luminance video signal so as to remove a hole or a chunk existing the detected area, the opening operation being defined as: $X_B=(X\ominus B_s)\oplus B$, and the closing operation being defined as : $X_B=(X\oplus B_s)\ominus B$, where X is the video signal, B is a set of structuring element of the over-luminance video signal, $B_s$ is a set symmetrical to B, $\oplus$ is Minkowski addition, $\ominus$ is Minkowski subtraction, $X_B$ is the result of operation.

2. The image processing device according to claim 1, wherein said filtering means first applies the opening operation to the over-luminance area and then applies the closing operation to the over-luminance area.

3. The image processing device according to claim 1, wherein said filtering means first applies the closing operation to the over-luminance area and then applies the opening operation to the over-luminance area.

4. An image processing method for indicating an over-luminance area in a target image displayed on a display is provided, comprising steps of:
    receiving a video signal representing the target image;
    detecting a luminance of the input video signal, and comparing the detected luminance with a predetermined threshold so as to extract an over-luminance video signal representing an over-luminance area;
    applying a filtering operation to the over-luminance video signal so as to remove a hole or a chunk existing in a detected area;
    generating a zebra pattern video signal and overlapping the zebra pattern video signal with the processed over-luminance video signal so as to generate and output a first mixing signal formed by mixing the zebra pattern video signal and the over-luminance video signal;
    mixing the first mixing signal and the video signal representing the target image to generate and output a second mixing signal; and
    displaying the image having the zebra pattern overlapped on the detected over-luminance area, based on the second mixing signal, wherein said filtering step applies an opening operation and a closing operation to the over-luminance video signal so as to remove a hole or a chunk existing the detected area, the opening operation being defined as: $X_B=(X\ominus B_s)\oplus B$, and the closing operation being defined as : $X_B=(X\oplus B_s)\ominus B$, where X is the video signal, B is a set of structuring element of the over-luminance video signal, $B_s$ is a set symmetrical to B, $\oplus$ is Minkowski addition, $\ominus$ is Minkowski subtraction, $X_B$ is the result of operation.

5. The image processing method according to claim 4, wherein said filtering step first applies the opening operation to the over-luminance area and then applies the closing operation to the over-luminance area.

6. The image processing method according to claim 4, wherein said filtering step first applies the closing operation to the over-luminance area and then applies the opening operation to the over-luminance area.

7. An image processing device comprising:
   detecting means for detecting a luminance of an input video signal representing a target image, and comparing the detected luminance with a first predetermined threshold so as to extract a first over-luminance video signal representing an over-luminance area;
   morphological filtering means for applying a morphological filtering process to the first over-luminance video signal so as to generate a second video signal;
   second detecting means for detecting a second over-luminance video signal higher than the adaptive threshold in the second video signal by using an adaptive threshold;
   over-luminance signal mixing means for adding the first over-luminance video signal and the second over-luminance video signal to form a third over-luminance video signal;
   zebra pattern generating means for generating a zebra video signal and overlapping the zebra video signal with the third over-luminance video signal to generate and output a first mixing signal formed by the zebra pattern video signal and the third over-luminance video signal;
   video signal mixing means for mixing the first mixing signal and the video signal representing the target image to generate and output a second mixing signal; and
   display means for displaying the target image having the over-luminance area masked by the zebra pattern, based on the second mixing signal.

8. The image processing device according to claim 7, wherein said morphological filtering means is dilation morphological filtering means, the dilation morphological filtering process being defined as:

$$A \oplus B_s = \bigcup_{b \in B} (A)_{-b}$$

where A is the over-luminance video signal, B is a set of structuring element of the over-luminance video signal, $B_s$ is a set symmetrical to B, b is a structuring element of B, $\oplus$ is Minkowski addition, $\cup$ denotes set union, and $(A)_{-b}$ represents the set in which an original image A is shifted or translated over the b.

9. The image processing device according to claim 7, wherein said morphological filtering means is erosion morphological filtering means, the erosion morphological filtering process being defined as:

$$A \ominus B_s = \bigcap_{b \in B} (A)_{-b}$$

where A is the over-luminance video signal, B is a set of structuring element of the over-luminance video signal, $B_s$ is a set symmetrical to B, b is a structuring element of B, $\ominus$ is Minkowski subtraction, $\cap$ denotes set intersection, and $(A)_{-b}$ represents the set in which an original image A is shifted or translated over the b.

10. The image processing device according to any one of claims 7 to 9, wherein the second detecting means generates the adaptive threshold based on the first over-luminance video signal and the second video signal.

11. The image processing device according to claim 7, wherein the second detecting means is to select the adaptive threshold from a plurality of thresholds.

12. A video camera comprising the image processing device of claim 7.

13. An image processing method for indicating an over-luminance area in a target image displayed on a display is provided, the method comprising steps of:
   receiving a video signal representing the target image;
   detecting a luminance of the input video signal, and comparing the detected luminance with a first predetermined threshold so as to extract a first over-luminance video signal representing an over-luminance area;
   applying a morphological filtering process to the first over-luminance video signal so as to generate a second video signal;
   detecting a second over-luminance video signal higher than the adaptive threshold in the second video signal by using an adaptive threshold;
   adding the first over-luminance video signal and the second over-luminance video signal to form a third over-luminance video signal;
   generating a zebra video signal and overlapping the zebra video signal with the third over-luminance video signal to generate and output a first mixing signal formed by mixing the zebra pattern video signal and the third over-luminance video signal;
   mixing the first mixing signal and the video signal representing the target image to generate and output a second mixing signal; and
   displaying the target image having the over-luminance area masked by the zebra pattern, based on the second mixing signal.

14. The image processing method according to claim 13, wherein said morphological filtering step is to apply a dilation morphological filtering process, the dilation morphological filtering process being defined as:

$$A \oplus B_s = \bigcup_{b \in B} (A)_{-b}$$

where A is the over-luminance video signal, B is a set of structuring element of the over-luminance video signal, $B_s$ is a set symmetrical to B, b is a structuring element of B, $\oplus$, is Minkowski addition, $\cup$ denotes set union, and $(A)_{-b}$ represents the set in which an original image A is shifted or translated over the b.

15. The image processing method according to claim 13, wherein said morphological filtering step is to apply a erosion morphological filtering process, the erosion morphological filtering process being defined as:

$$A \ominus B_s = \bigcap_{b \in B} (A)_{-b}$$

where A is the over-luminance video signal, B is a set of structuring element of the over-luminance video signal, $B_s$ is a set symmetrical to B, b is a structuring element of B, $\ominus$ is Minkowski subtraction, $\cap$ denotes set intersec tion, and $(A)_{-b}$ represents the set in which an original image A is shifted or translated over the b.

16. The image processing method according to claim 13 wherein the detecting step for detecting a second over-luminance video signal generates the adaptive threshold based on the first over-luminance video signal and the second video signal.

17. The image processing method according to claim 13 wherein the detecting step for detecting a second over-luminance video signal is to select the adaptive threshold from a plurality of thresholds.

* * * * *